United States Patent

[11] 3,590,717

| [72] | Inventors | Karl-Heinz Raab<br>Bad Kreuznach, Germany; |
|---|---|---|
| [21] | Appl. No. | 777,706 |
| [22] | Filed | Nov. 21, 1968 |
| [45] | Patented | July 6, 1971 |
| [73] | Assignee | Jos. Schneider & Co. Optische Werke<br>Kreuznach, Bad Kreuznach Rhineland,<br>Germany |
| [32] | Priority | Nov. 29, 1967 |
| [33] | | Germany |
| [31] | | P 15 97 419.3 |

[54] DIAPHRAGM-PRESELECTOR MECHANISM FOR CAMERAS WITH DETACHABLE OBJECTIVES
5 Claims, 3 Drawing Figs.

| [52] | U.S. Cl. | 95/64, 95/44 |
|---|---|---|
| [51] | Int. Cl. | G03b 9/07 |
| [50] | Field of Search | 95/64 B |

[56] References Cited
UNITED STATES PATENTS

| 1,682,813 | 9/1928 | Thompson | 95/31 |
|---|---|---|---|
| 2,943,551 | 7/1960 | Gebele | 95/64 |
| 2,981,169 | 4/1961 | Schütz | 95/64 |
| 3,165,997 | 1/1965 | Sugano et al. | 95/64 |
| 3,348,460 | 10/1967 | Schmitt | 95/53 |
| 3,447,431 | 6/1969 | Kiper | 95/64 |

*Primary Examiner*—Samuel S. Matthews
*Assistant Examiner*—Michael D. Harris
*Attorney*—Karl F. Ross ABSTRACT: A diaphragm-control member on a detachable camera objective is actuated by the closure of a switch upon depression of a shutter-trip button on the camera, this switch energizing an electromagnet on the objective which moves the control member—specifically a bellcrank lever—into contact with an adjustable abutment to establish a preselected diaphragm aperture.

PATENTED JUL 6 1971  3,590,717
Fig.1
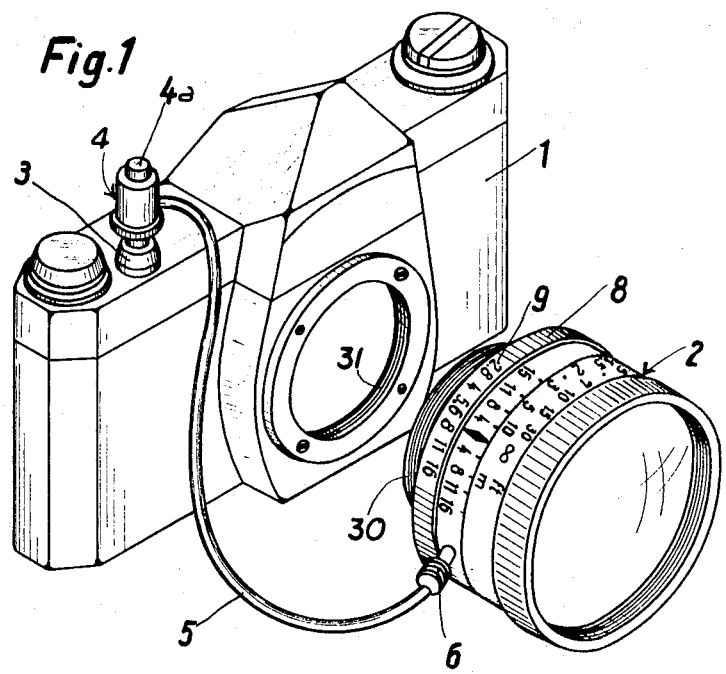
Fig.2
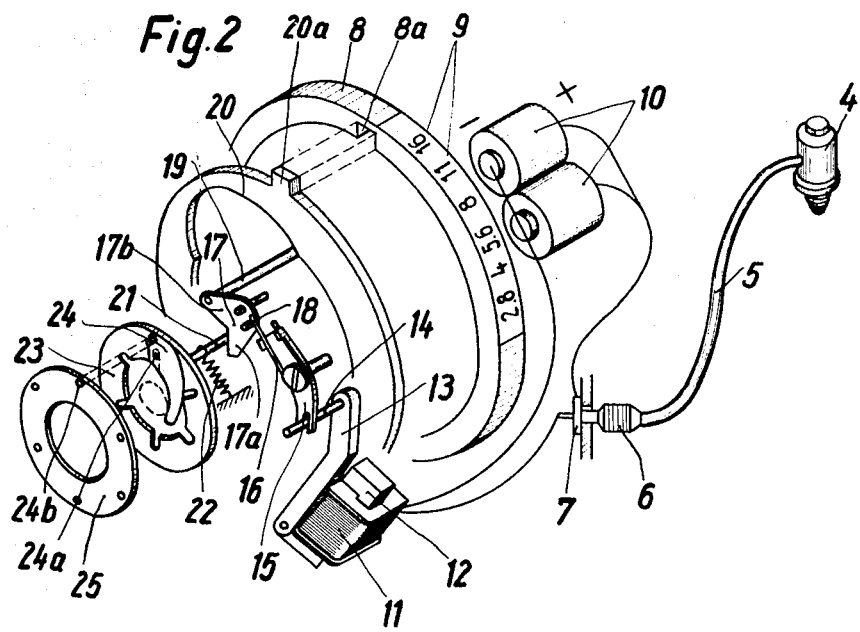
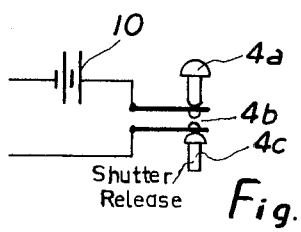
Fig. 3
Karl-Heinz Raab
Inventor
Karl F. Ross
Attorney

DIAPHRAGM-PRESELECTOR MECHANISM FOR CAMERAS WITH DETACHABLE OBJECTIVES

My present invention relates to a photographic or cinematographic camera in which a preselector mechanism enables the presetting of a desired diaphragm aperture, the diaphragm being normally held in an extreme position (e.g. wide open to facilitate focusing, as in a reflex camera) and being displaced into the preselected position just before the tripping of an associated shutter.

Such preselector systems are well known per se, e.g. from commonly owned U.S. Pat. Nos. 2,981,169 and 3,054,336; see also my copending application Ser. No. 536,127 now U.S. Pat. No. 3,451,325 filed March 21, 1966.

In some cameras, especially those wherein the shutter and its release mechanism are mounted on a camera housing while the objective with its diaphragm and associated control means constitutes a detachable unit, e.g. for the purpose of replacement by another objective of different focal length, difficulties have heretofore arisen in designing a mechanical linkage capable of reliably coupling the shutter release on the camera housing with the diaphragm control of such a detachable objective, having regard to the requirement for precise axial alignment of the cooperating components and to the diversity of commercially available camera constructions to which such a system should be applicable.

It is, therefore, a general object of my invention to provide a virtually universally applicable preselector mechanism of simple construction for use in a camera having a shutter-trip button on its housing and a diaphragm-control member on a detachable objective.

This object is realized, pursuant to my present invention, by the provision of electromagnetic means on the objective operatively linked with a setting means for the diaphragm-control member, the electromagnetic means being energizable upon closure of a switch on the camera housing by manipulation of a shutter-release mechanism.

More particularly, the actuator for the shutter release may include a pushbutton in a nipple which is screwed onto or otherwise detachably secured to the camera housing, the switch means being disposed inside the nipple; a cable extending from the nipple terminates in an electrical connector, such as a plug, adapted to engage a mating connector (jack) on the objective to establish a flexible connection between the switch on the camera housing and the electromagnet on the separable objective body.

The above and other features of my invention will become more readily apparent from the following description, reference being made to the accompanying drawing in which:

FIG. 1 is a perspective view of a reflex camera according to the invention, having a housing and a separable objective linked by a diaphragm-control cable;

FIG. 2 is an exploded perspective view of the objective assembly of FIG. 1; and

FIG. 3 is a schematic detail view.

The camera shown in the drawing comprises a housing 1 and an objective 2, the objective having a threaded flange 30 by which it may be screwed into a complementarily threaded seat 31 on the housing; the threads 30, 31 can also be replaced by some other conventional mounting, such as a bayonet coupling.

The camera housing 1 carries a boss 3 with female threads detachably receiving an actuator 4 in the form of a complementarily threaded nipple having a pushbutton 4a therefrom; a flexible cable 5 extends from the nipple 4 toward the objective 2 and terminates in a plug 5 receivable in a jack 7 of the objective body. As illustrated diagrammatically in FIG. 3, pushbutton 4a bears upon a stud 4c through the intermediary of a switch 4b consisting of two normally open contacts, this switch lying in series with a power source 10 more fully illustrated in FIG. 2 as a pair of dry cells connected in parallel. Stud 4c is part of a conventional shutter-release mechanism, not further illustrated, and is biased into the position of FIG. 3 by a spring force strong enough to resist the force in the elastic switch contacts 4b which tends to spread these contacts apart.

As will be apparent, manual depression of pushbutton 4a closes the contacts 4b before displacing the stud 4c to trip the shutter (not shown) within housing 1.

Objective 2 carries a selector ring 8 with a scale 9 having the usual diaphragm stops marked thereon. An electromagnet 11 within the objective body has a core 12 designed to attract, when energized, a pivoted armature 13 which carries a pin 14 engaging a bifurcation of an intermediate setting lever 15 supporting a hairpin-type spring 16. An extremity of spring 16 bears upon a pin 18 on an arm 17a of a bellcrank lever 17 whose other arm 17b supports an axially extending rod 19. A cam ring 20, coupled with selector ring 8 through a lug 20a engaging in a recess 8a of the latter, forms an abutment for the pin 19 to limit the clockwise deflection of that pin upon a counterclockwise swing of setting lever 15 in the energized state of magnet 11. Such clockwise swing is resisted by a biasing spring 22 anchored to a rod 21 which rests against the arm 17a of control lever 17 and is rigid with a setting ring 23. A diaphragm, of which only one iris leaf 24 has been illustrated, is adjustable in the conventional manner by a relative rotation of setting ring 23 and a stationary mounting ring 25, leaf 24 being pivotable about a mounting pin 24b on ring 25 and carrying a setting pin 24a engaging in a camming slot of ring 23.

In operation, selector ring 8 is rotated into a desired stop position and entrains the abutment ring 20 coupled therewith, the aperture of diaphragm 24 being unaffected by this rotation since spring 22 biases the diaphragm into its wide-open position. When the user subsequently depresses the pushbutton 4a, closure of switch 4b energizes the magnet 11 and sets the diaphragm to its preselected position before the shutter is tripped. Upon the subsequent release of the pushbutton, spring 22 restores the diaphragm to its normal position.

Upon the unscrewing of nipple 4, boss 3 forms a socket for a Bowden cable serving for the remote actuation of the shutter release.

It will be evident that the flexibility of cable 5 and its detachable connection with objective 2 facilitates the replacement of that objective by other objectives of different optical and/or physical characteristics.

If the camera were of the cinematographic variety, the actuator 4 would operate a film transport in timed relationship with a recurring opening on the shutter as is well known in the art. 1

2 I 3 claim:

1. In a camera having a housing and an objective on said housing with an adjustable diaphragm and a control member for setting said diaphragm to different apertures, the combination therewith of preselector means on said objective including an adjustable abutment, setting means on said objective for displacing said control member into engagement with said abutment to move said diaphragm into a position corresponding to a preselected aperture, electromagnetic means on said objective operatively linked with said setting means, a nipple on said housing, an actuator connected with said nipple for tripping a shutter associated with said diaphragm, and energizing means for said electromagnetic means including a switch in said nipple mechanically linked with said actuator for operation thereby to operate said electromagnetic means for displacing said control member just prior to a tripping of said shutter upon manipulation of said actuator.

2. The combination defined in claim 1 wherein said electromagnetic means comprises an armature, said control member being a bellcrank lever having a first arm engageable with said abutment, said setting means including a resilient link between said armature and a second arm of said lever.

3. The combination defined in claim 1 wherein said actuator comprises pushbutton detachably secured to said nipple.

4. The combination defined in claim 3 wherein said energizing means further comprises a flexible cable extending from said nipple and a pair of mating electrical connectors on said cable and on said objective.

5. The combination defined in claim 1, further comprising spring means coupled with said control member for maintaining same disengaged from said abutment in the deenergized state of said electromagnetic means.